US011390271B2

(12) United States Patent
Shoda et al.

(10) Patent No.: US 11,390,271 B2
(45) Date of Patent: Jul. 19, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yasushi Shoda, Wako (JP); Junpei Noguchi, Wako (JP); Yuki Hara, Wako (JP); Ryoma Taguchi, Tokyo (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 192 days.

(21) Appl. No.: 16/808,436

(22) Filed: Mar. 4, 2020

(65) Prior Publication Data

US 2020/0290598 A1 Sep. 17, 2020

(30) Foreign Application Priority Data

Mar. 15, 2019 (JP) .............................. JP2019-048737

(51) Int. Cl.
*B60W 30/06* (2006.01)
*B60W 10/04* (2006.01)
*B60W 10/20* (2006.01)

(52) U.S. Cl.
CPC ............ *B60W 30/06* (2013.01); *B60W 10/04* (2013.01); *B60W 10/20* (2013.01); *B60W 2540/041* (2020.02); *B60W 2710/20* (2013.01); *B60W 2720/10* (2013.01); *B60W 2720/12* (2013.01)

(58) Field of Classification Search
CPC ...... B60W 30/06; B60W 10/04; B60W 10/20; B60W 2540/041; B60W 2710/20; B60W 2720/10; B60W 2720/12; B62D 15/0285; G05D 1/024; G05D 1/0221; G05D 1/0223;
(Continued)

(56) References Cited

U.S. PATENT DOCUMENTS

| 2017/0161569 | A1* | 6/2017 | Ren ..................... G06V 20/582 |
| 2018/0194354 | A1* | 7/2018 | Takeda ..................... B60T 7/12 |
| 2018/0208245 | A1* | 7/2018 | Mizutani ............... B60W 30/06 |

(Continued)

FOREIGN PATENT DOCUMENTS

| JP | 2004-268829 | 9/2004 |
| JP | 2011-156955 | 8/2011 |

(Continued)

OTHER PUBLICATIONS

Japanese Office Action for Japanese Patent Application No. 2019-048737 dated May 31, 2022.

*Primary Examiner* — Jonathan M Dager
*Assistant Examiner* — Jean W Charleston
(74) *Attorney, Agent, or Firm* — Amin, Turocy & Watson, LLP (57) ABSTRACT

A vehicle control device includes a detector configured to detect a vicinity situation of a vehicle, a first controller configured to cause the vehicle to move to a position at which a user of the vehicle gets on or gets off the vehicle by controlling a speed and steering of the vehicle on the basis of the vicinity situation detected by the detector, and a second controller configured to reduce a detection load of the detector when the vehicle moves to the position as compared to when the vehicle does not move to the position.

10 Claims, 9 Drawing Sheets

(58) Field of Classification Search
CPC .... G05D 1/0251; G05D 1/0257; G05D 1/028; G05D 1/0285; G05D 2201/0206
USPC .......................................................... 701/25
See application file for complete search history.

(56) References Cited

U.S. PATENT DOCUMENTS

| | | | |
|---|---|---|---|
| 2018/0339702 A1* | 11/2018 | Kim | G06V 20/58 |
| 2019/0161119 A1* | 5/2019 | Greenwood | G08G 1/00 |
| 2019/0202442 A1* | 7/2019 | Lavoie | H04W 4/023 |
| 2019/0236955 A1* | 8/2019 | Hu | G08G 1/096844 |
| 2020/0023837 A1* | 1/2020 | Yokoi | B60W 30/0956 |

FOREIGN PATENT DOCUMENTS

| | | |
|---|---|---|
| JP | 2017-181063 | 10/2017 |
| JP | 2018-081050 | 5/2018 |

* cited by examiner

VEHICLE CONTROL DEVICE, VEHICLE CONTROL METHOD, AND STORAGE MEDIUM

CROSS-REFERENCE TO RELATED APPLICATION

This application is based upon and claims the benefit of priority from Japanese Patent Application No. 2019-048737, filed Mar. 15, 2019, the entire content of which is incorporated herein by reference.

BACKGROUND

Field of the Invention

The present invention relates to a vehicle control device, a vehicle control method, and a storage medium.

Description of Related Art

In recent years, research on automatic control of a vehicle has been conducted. On the other hand, a technology is known, which sets a first region in which a host vehicle is predicted to travel in the future, sets a second region in which a pedestrian may enter on both sides of the set first region on the basis of a maximum moving speed of the pedestrian and a speed of the host vehicle, determines that a risk of collision between the pedestrian and the host vehicle is high when there is a pedestrian in the first region or the second region, and determines that the risk of collision between the pedestrian and the host vehicle is low when there are no pedestrians in the first region or the second region (for example, refer to Japanese Unexamined Patent Application, First Publication No. 2004-268829).

SUMMARY

However, according to the conventional technology, when a vehicle is caused to approach up to a distance close to a user as in valet parking, since it can be determined that a probability of collision between the vehicle and the user is high, the vehicle had to be stopped at a position away from the user in some cases.

Embodiments of the present invention provide a vehicle control device, a vehicle control method, and a storage medium that can cause a vehicle to appropriately approach near a user.

The vehicle control device, the vehicle control method, and the storage medium according to the present invention have adopted the following configuration.

(1): According to one aspect of the present invention, a vehicle control device includes a detector configured to detect a vicinity situation of a vehicle, a first controller configured to cause the vehicle to move to a position at which a user of the vehicle gets on or gets off the vehicle by controlling a speed and steering of the vehicle on the basis of the vicinity situation detected by the detector, and a second controller configured to reduce a detection load of the detector when the vehicle moves to the position as compared to when the vehicle does not move to the position.

(2): In the vehicle control device according to the aspect of (1) described above, the detector is configured to detect regions on both sides of the vehicle, and the second controller is configured to reduce the detection load by making, among the regions on both sides of the vehicle near the position, a first region on a side in which the user is assumed not to be present smaller than a second region on the other side in which the user is assumed to be present until the vehicle moves to the position.

(3): In the vehicle control device according to the aspect of (2) described above, the second controller is configured to reduce a region of the first region above a reference position in a vertical direction.

(4): In the vehicle control device of the aspect of (2) or (3) described above, the second controller is configured to reduce the first region in a horizontal direction.

(5): In the vehicle control device of the aspect of any one of (2) to (4) described above, the detector is configured to detect the vicinity situation by repeatedly scanning an interior of the region, and the second controller, when the first region is reduced, is configured to shorten a scan cycle at the time of scanning the second region as compared to when the first region is not reduced.

(6): In the vehicle control device of the aspect of (5) described above, the second controller is configured to shorten the scan cycle of the second region in accordance with a degree of reduction of the first region.

(7): In the vehicle control device of the aspect of any one of (1) to (6) described above, the second controller is configured to reduce the detection load as the vehicle approaches the position, and does not reduce the detection load when the vehicle has departed from the position.

(8): In the vehicle control device of the aspect of any one of (1) to (7) described above, the second controller is configured to reduce the detection load as a speed of the vehicle at the time of approaching the position decreases.

(9): In the vehicle control device of the aspect of any one of (1) to (8) described above, the second controller is configured to return the reduced detection load to an original size before the reduction when the user has started manual driving.

(10): According to another aspect of the present invention, a vehicle control method includes, by a computer, detecting a vicinity situation of a vehicle, causing the vehicle to move to a position at which a user of the vehicle gets on or off the vehicle by controlling a speed and steering of the vehicle on the basis of the detected vicinity situation, and reducing a detection load of the vicinity situation when the vehicle moves to the position as compared to when the vehicle does not move to the position.

(11): According to still another aspect of the present invention, a computer-readable non-transitory storage medium stores a program causing an on-vehicle computer to execute detecting a vicinity situation of a vehicle, causing the vehicle to move to a position at which a user of the vehicle gets on or off the vehicle by controlling a speed and steering of the vehicle on the basis of the detected vicinity situation, and reducing a detection load of the vicinity situation when the vehicle moves to the position as compared to when the vehicle does not move to the position.

According to (1) to (11), it is possible to cause a vehicle to appropriately approach up to near a user.

DETAILED DESCRIPTION OF EMBODIMENTS

Hereinafter, embodiments of a vehicle control device, a vehicle control method, and a storage medium of the present invention will be described with reference to the drawings. In the following description, a case in which left-hand traffic rules are applied will be described, but when right-hand traffic rules are applied, the left and right may be replaced in reverse.

[Overall Configuration]

Figure 1:
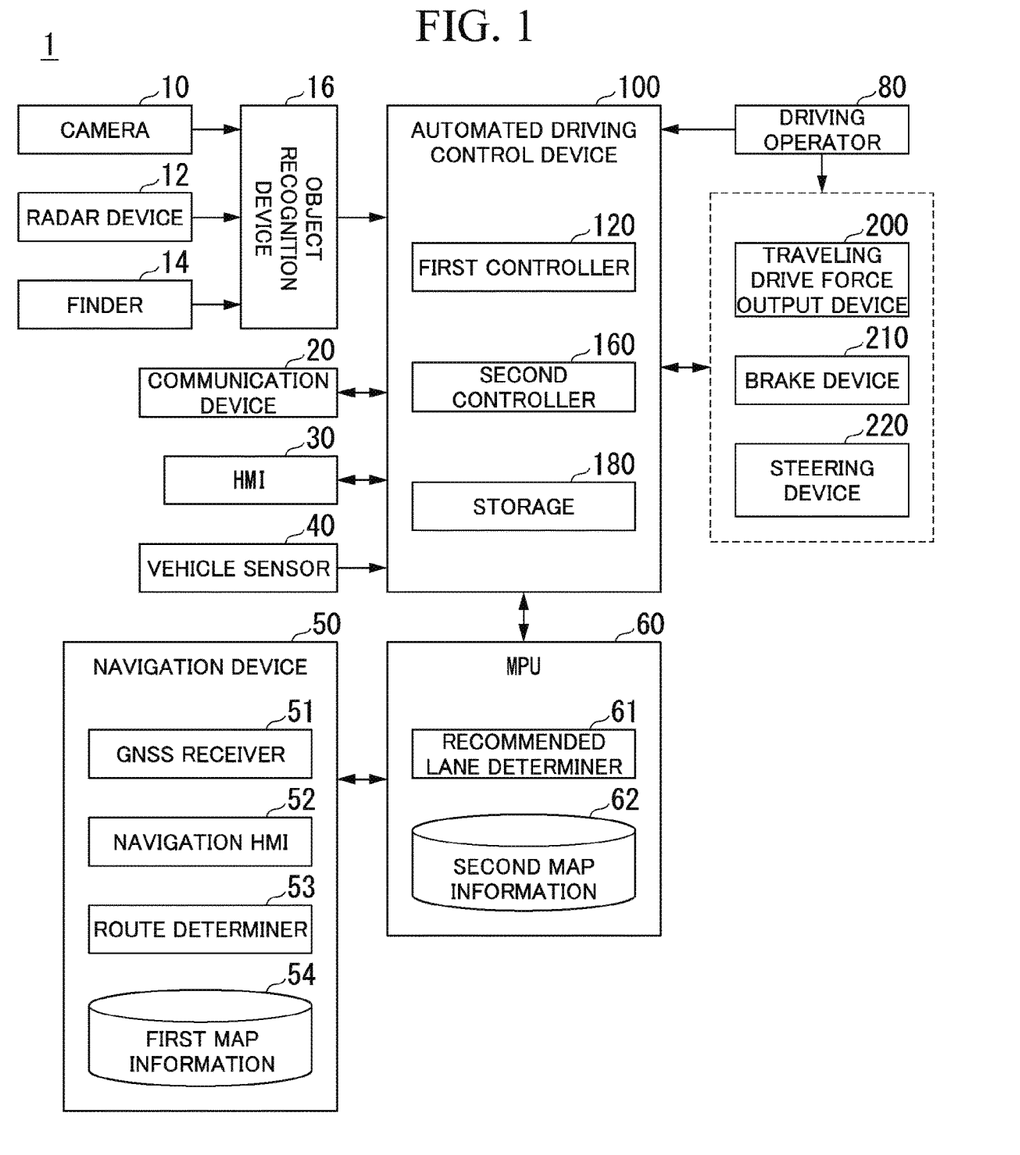
FIG. 1 is a configuration diagram of a vehicle system using a vehicle control device according to an embodiment.

FIG. 1 is a configuration diagram of a vehicle system 1 using a vehicle control device according to an embodiment. A vehicle on which the vehicle system 1 is mounted is, for example, two-wheel, three-wheel, or four-wheel vehicle, and a driving source thereof is an internal combustion engine such as a diesel engine or a gasoline engine, an electric motor, or a combination thereof. The electric motor operates using electric power generated by a generator connected to the internal combustion engine, or electric power discharged from a secondary battery or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a traveling drive force output device 200, a brake device 210, and a steering device 220. These devices or apparatuses are connected to each other by a multiplex communication line such as a controller area network (CAN) communicator line, a serial communication line, a wireless communication network, or the like. The configuration shown in FIG. 1 is merely an example, and a part of the configuration may be omitted or another configuration may be added.

The camera 10 is, for example, a digital camera using a solid-state imaging device such as a charge coupled device (CCD) or a complementary metal oxide semiconductor (CMOS). The camera 10 is attached to an arbitrary position of a vehicle (hereinafter, a host vehicle M) on which the vehicle system 1 is mounted. When the front is imaged, the camera 10 is attached to an upper part of the front windshield, a back of the rearview mirror, or the like. The camera 10 periodically repeats to image a vicinity of the host vehicle M. The camera 10 may also be a stereo camera.

The radar device 12 radiates radio waves such as millimeter waves to the vicinity of the host vehicle M, and detects at least a position (a distance and an orientation) of an object by detecting radio waves (reflected waves) reflected by the object. The radar device 12 is attached to an arbitrary part of the host vehicle M. The radar device 12 may detect the position and a speed of the object using a frequency modulated continuous wave (FM-CW) method.

The finder 14 is a light detection and range (LIDAR). The finder 14 radiates light to the vicinity of the host vehicle M and measures scattered light. The finder 14 detects a distance to the object on the basis of time from light emission and light reception. The radiated light is, for example, pulsed laser light. The finder 14 is attached to an arbitrary part of the host vehicle M.

The object recognition device 16 performs sensor fusion processing on a result of detection performed by some or all of the camera 10, the radar device 12, and the finder 14, and recognizes the position, type, speed, and the like of the object. The object recognition device 16 outputs a result of the recognition to the automated driving control device 100. The object recognition device 16 may output the results of detection by the camera 10, the radar device 12, and the finder 14 to the automated driving control device 100 as they are. The object recognition device 16 may be omitted from the vehicle system 1.

The communication device 20 uses, for example, a cellular network, a Wi-Fi network, a Bluetooth (a registered trademark), a dedicated short range communication (DSRC), or the like, and communicates with another vehicle or a parking lot management device (to be described below) present in the vicinity of the host vehicle M or various types of server devices.

The HMI 30 presents various types of information to an occupant of the host vehicle M and receives an input operation from the occupant. The HMI 30 includes various display devices, speakers, buzzers, touch panels, switches, keys, and the like.

The vehicle sensor 40 includes a vehicle speed sensor that detects the speed of the host vehicle M, an acceleration sensor that detects the acceleration, a yaw rate sensor that detects an angular speed around a vertical axis, an orientation sensor that detects a direction of the host vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies the position of the host vehicle M on the basis of a signal received from a GNSS satellite. The position of the host vehicle M may be identified or supplemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determiner 53 determines, for example, a route (hereinafter, a route on a map) from the position (or an arbitrary input position) of the host vehicle M identified by the GNSS receiver 51 to a destination input from the occupant using the navigation HMI 52 with reference to the first map information 54. The first map information 54 is, for example, information in which a road shape is expressed by a link indicating a road and a node connected by the link. The first map information 54 may include curvature of a road, point of interest (POI) information, and the like. The route on a map is output to the MPU 60. The navigation device 50 may perform route guidance using the navigation HMI 52 on the basis of the route on a map. The navigation device 50 may be realized by, for example, a function of a terminal device such as a smart phone or a tablet terminal owned by the occupant. The navigation device 50 may transmit a current position and a destination to a navigation server via the communication device 20 and acquire a route equivalent to the route on a map from the navigation server.

The MPU 60 includes, for example, a recommended lane determiner 61, and holds second map information 62 in the storage device such as an HDD or a flash memory. The recommended lane determiner 61 divides the route on a map provided from the navigation device 50 into a plurality of blocks (for example, divides every 100 [m] in a vehicle traveling direction), and determines a recommended lane for each block with reference to the second map information 62. The recommended lane determiner 61 determines which numbered lane to travel from the left. When there is a branch point in the route on a map, the recommended lane determiner 61 determines a recommended lane such that the host vehicle M travels in a reasonable route for traveling to a branch destination.

The second map information 62 is map information with higher accuracy than the first map information 54. The second map information 62 includes, for example, information on a center of a lane or information on a boundary of the lane. The second map information 62 may include road information, traffic regulation information, address information (addresses/postal codes), facility information, telephone number information, and the like. The second map information 62 may be updated at any time by the communication device 20 communicating with another device.

The driving operator 80 includes, for example, an accelerator pedal, a brake pedal, a shift lever, a steering wheel, a modified steer, a joystick, and other operators. A sensor that detects an operation amount or a presence or absence of an operation is attached to the driving operator 80, and this detection result is output to the automated driving control device 100 or some or all of the traveling drive force output device 200, the brake device 210, and the steering device 220.

The automated driving control device 100 includes, for example, a first controller 120, a second controller 160, and a storage 180. Each of the first controller 120 and the second controller 160 is realized, for example, by a processor such as a central processing unit (CPU) or a graphics processing unit (GPU) executing a program (software). Some or all of these components may be realized by hardware (a circuit; including circuitry) such as a large scale integration (LSI), an application specific integrated circuit (ASIC), or a field-programmable gate array (FPGA), and may also be realized by a cooperation of software and hardware. The program may be stored in advance in an HDD or a flash memory of the storage 180 of the automated driving control device 100, or may be stored in a detachable storage medium such as a DVD or a CD-ROM and installed in the storage 180 of the automated driving control device 100 by the storage medium (the non-transitory storage medium) being mounted on a drive device.

The storage 180 is realized by, for example, an HDD, a flash memory, an electrically erasable programmable read only memory (EEPROM), a read only memory (ROM), a random access memory (RAM), or the like. The storage 180 stores, for example, a program and the like read and executed by a processor.

Figure 2:
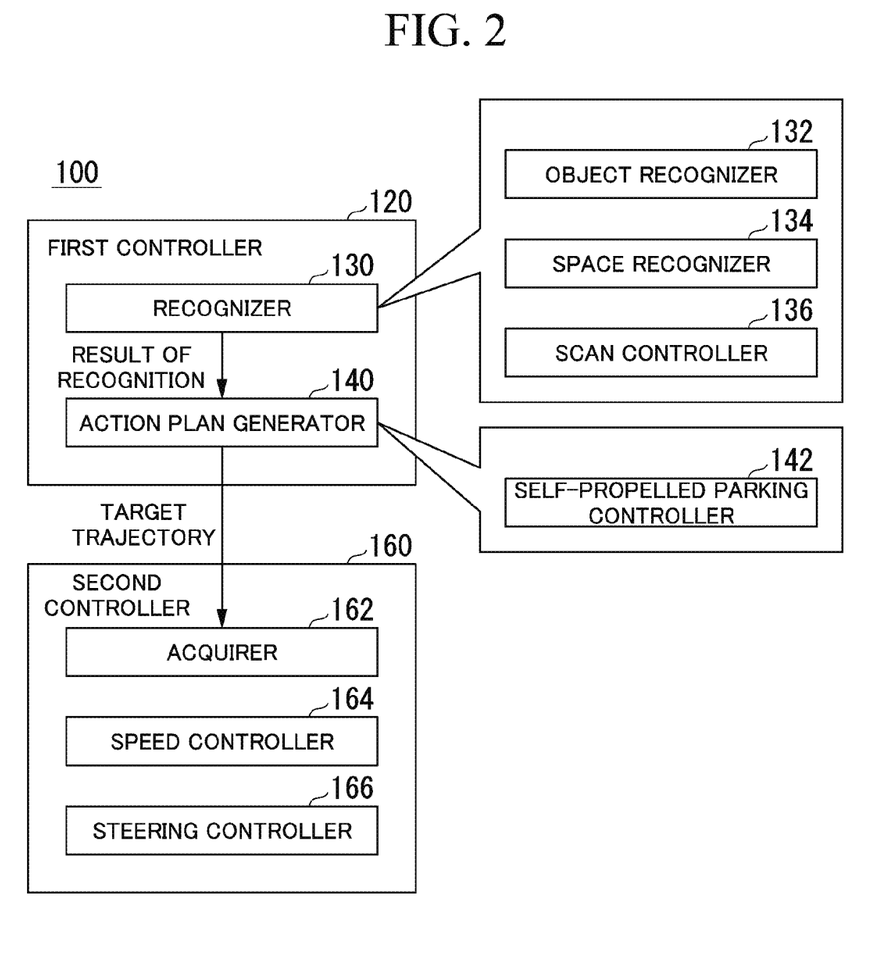
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140.

The first controller 120 realizes, for example, a function based on artificial intelligence (AI) and a function based on a model given in advance in parallel. For example, a function of "recognizing an intersection" may be realized by executing a recognition of an intersection by deep learning or the like and a recognition based on conditions (including pattern matching signals, road markings, and the like) given in advance in parallel and comprehensively evaluating the both by scoring them. As a result, a reliability of automated driving is guaranteed.

The recognizer 130 includes, for example, an object recognizer 132, a space recognizer 134, and a scan controller 136. A combination of the camera 10, the radar device 12, the finder 14, the object recognition device 16, the object recognizer 132, and the space recognizer 134 is an example of a "detector," and the scan controller 136 is an example of the "second controller."

The object recognizer 132 recognizes a vicinity situation of the host vehicle M on the basis of information input from the camera 10, the radar device 12, and the finder 14 via the object recognition device 16. The vicinity situation is an environment surrounding the host vehicle M, and includes, for example, objects such as people or vehicles present in the vicinity of the host vehicle M. The vicinity situation may include positions, states, operations, and the like of the objects. That is, the object recognizer 132 recognizes (detects) at least one element among various elements such as objects present in the vicinity of the host vehicle M and the positions, states, operations, and the like of the objects.

For example, the object recognizer 132 recognizes (detects) the objects from a recognition space by repeatedly scanning the recognition space integrated by sensor fusion processing one-dimensionally or multi-dimensionally in a predetermined cycle T (predetermined frequency F) like a raster scan. The recognition space may be represented by, for example, a virtual space (for example, a virtual three-dimensional space having dimensions (bases) corresponding to a height, a width, and a depth, respectively) corresponding to a real space in which the host vehicle M is present. The positions of the objects in the recognition space are represented by, for example, coordinates when a representative point (a center of gravity, a center of a drive shaft, or the like) of the host vehicle M is set as an origin. The positions of the objects in the recognition space may be represented as representative points such as centers of gravity or corners of the objects, or may be represented as regions spatially spreading. The "states" of the objects includes speeds, accelerations, jerks, and the like. The "states" of the objects may include an "action state" (for example, whether a vehicle is changing a lane or intends to change a lane).

The space recognizer 134 recognizes a desired space such as a lane or a parking space present in the vicinity of the host vehicle M on the basis of the information input from the camera 10, the radar device 12, and the finder 14 via the object recognition device 16. For example, the space recognizer 134 recognizes road division lines in the vicinity of the host vehicle M from an image captured by the camera 10 by repeatedly scanning the image one-dimensionally or multi-dimensionally in the predetermined cycle T (the predetermined frequency F) like the raster scan, and recognizes a lane in which the vehicle travels (traveling lane) by comparing a pattern (for example, an array of solid lines and broken lines) of the recognized road division lines with a pattern of road division lines obtained from the second map information 62 using pattern matching and the like. The space recognizer 134 may recognize a traveling lane by recognizing not only road division lines but also road boundaries (road boundaries) including road division lines, road shoulders, curbs, median strips, guardrails, and the like. In this recognition, a result of processing by an INS and the position of the host vehicle M acquired from the navigation device 50 may also be considered.

When a traveling lane is recognized, the space recognizer 134 recognizes the position and posture of the host vehicle M with respect to the traveling lane. The space recognizer 134 may recognize, for example, a deviation of a reference point of the host vehicle M from a lane center and an angle of a traveling direction of the host vehicle M formed with respect to a line connecting the lane centers as the relative position and posture of the host vehicle M with respect to the traveling lane. Instead, the space recognizer 134 may recognize a position and the like of the reference point of the host vehicle M with respect to either side end (a road section line or a road boundary) of the traveling lane as a relative position of the host vehicle M with respect to the traveling lane. The recognizer 130 may recognize stop lines, obstacles, red lights, tollgates, and other road events.

The scan controller 136 dynamically changes the scan cycle T (frequency F) or changes a region size such as an area or a volume of a spatial region (hereinafter, referred to as a scan region) to be scanned when various types of recognition are performed by the object recognizer 132 and the space recognizer 134. Changing a region size includes changing any one of the width, depth, and height dimensions, or changing two or more dimensions.

The action plan generator 140 determines an event of automated driving on a route in which a recommended lane is determined. The event is information in which a traveling mode of the host vehicle M is defined.

Automated driving events include, for example, a parking event. The parking event is an event in which the occupant of the host vehicle M does not park the host vehicle M in a parking space but the host vehicle M is caused to autonomously travel and to park in a parking space as in a valet parking. The automated driving events may include, in addition to the parking event, a constant speed traveling event, a following-up and traveling event, a lane change event, a branching event, a merging event, an overtaking event, an avoidance event, a takeover event, and the like. The constant speed traveling event is an event that causes the host vehicle M to travel in the same lane at a constant speed. The following-up and traveling event is an event that causes the host vehicle M to follow up another vehicle (hereinafter, referred to as a preceding vehicle) which is present within a predetermined distance (for example, within 100 [m]) ahead of the host vehicle M and is closest to the host vehicle M. "Following up" may be, for example, a traveling mode in which a constant relative distance (an inter-vehicle distance) between the host vehicle M and the preceding vehicle is maintained, and may also be a traveling mode in which the host vehicle M is caused to travel along a center of a host lane in addition to the constant relative distance between the host vehicle M and the preceding vehicle being maintained. The lane change event is an event that causes the host vehicle M to change a lane from the host lane to an adjacent lane. The branching event is an event that causes the host vehicle M to branch to a lane on a destination side at a branch point of a road. The merging event is an event that causes the host vehicle M to merge with a main lane at a merging point. The overtaking event is an event that causes the host vehicle M to temporarily change a lane to an adjacent lane and causes it to change a lane back to the original lane after it overtakes a preceding vehicle in the adjacent lane. The avoidance event is an event that causes the host vehicle M to perform at least one of braking and steering to avoid an obstacle present in front of the host vehicle M. The takeover event is an event that ends automated driving and switches it to manual driving.

The action plan generator 140 may change an event already determined for a current section or a next section to another event or determine a new event for the current section or the next section in accordance with a vicinity situation recognized by the recognizer 130 when the vehicle M travels.

The action plan generator 140 generates a future target trajectory in which the host vehicle M travels, in principle, in a recommended lane determined by the recommended lane determiner 61 and, furthermore, the host vehicle M is caused to automatically (independently of an operation of a driver) travel in a traveling mode defined by an event to cope with a vicinity situation when the host vehicle M travels in the recommended lane. The target trajectory includes, for example, a position element that determines a position of the host vehicle M in the future, and a speed element that determines a speed, acceleration, and the like of the host vehicle M in the future.

For example, the action plan generator 140 determines a plurality of points (trajectory points) to be sequentially reached by the host vehicle M as the position element of the target trajectory. The trajectory point is a point to be reached by the host vehicle M for each predetermined traveling distance (for example, about several [m]). The predetermined traveling distance may be calculated, for example, based on a road distance when the vehicle proceeds along a route.

The action plan generator 140 determines a target speed and target acceleration for each predetermined sampling time (for example, about 0 decimal number second) as a speed element of the target trajectory. The trajectory point may be a position to be reached by the host vehicle M at a corresponding sampling time for each predetermined sampling time. In this case, the target speed and the target acceleration are determined by a sampling time and an interval between trajectory points. The action plan generator 140 outputs information indicating the generated target trajectory to the second controller 160.

The self-propelled parking controller 142 is a function of the action plan generator 140, and is started when the action plan generator 140 executes a self-propelled parking event. Details of functions of the self-propelled parking controller 142 will be described below.

The second controller 160 controls the traveling drive force output device 200, the brake device 210, and the steering device 220 such that the host vehicle M passes through the target trajectory generated by the action plan generator 140 at a scheduled time.

The second controller 160 includes, for example, an acquirer 162, a speed controller 164, and a steering controller 166. A combination of the action plan generator 140 and the second controller 160 is an example of the "first controller."

The acquirer 162 acquires information on the target trajectory (trajectory points) generated by a target trajectory generator 144, and stores it in a memory of the storage 180.

The speed controller 164 controls one or both of the traveling drive force output device 200 or the brake device 210 on the basis of a speed element (for example, a target speed, a target acceleration, or the like) included in the target trajectory stored in the memory.

The steering controller 166 controls the steering device 220 in accordance with a position element (for example, a curvature indicating a degree of bending of the target trajectory, and the like) included in the target trajectory stored in the memory.

Processing of the speed controller 164 and the steering controller 166 is realized by, for example, a combination of feed forward control and feedback control. As an example, the steering controller 166 executes a combination of the feed forward control in accordance with curvature of a road in front of the host vehicle M and the feedback control based on a deviation of the vehicle M with respect to the target trajectory.

The traveling drive force output device 200 outputs a traveling drive force (torque) for a traveling of a vehicle to drive wheels. The traveling drive force output device 200 includes, for example, a combination of an internal combustion engine, an electric motor, a transmission, and the like, and a power electronic control unit (ECU) that controls these. The power ECU controls the constituents described above according to information input from the second controller 160 or information input from the driving operator 80.

The brake device 210 includes, for example, a brake caliper, a cylinder that transmits a hydraulic pressure to the brake caliper, an electric motor that generates a hydraulic pressure to the cylinder, and a brake ECU. The brake ECU controls the electric motor according to the information input from the second controller 160 or the information input from the driving operator 80 such that a brake torque corresponding to a braking operation is output to each wheel. The brake device 210 may include, as a backup, a mechanism that transmits the hydraulic pressure generated by an operation of the brake pedal included in the driving operator 80 to the cylinder via a master cylinder. The brake device 210 is not limited to the configuration described above, and may be an electronically controlled hydraulic brake device that controls an actuator according to the information input from the second controller 160 and transmits the hydraulic pressure of the master cylinder to the cylinder.

The steering device 220 includes, for example, a steering ECU and an electric motor. The electric motor changes a direction of the steering wheel by, for example, applying a force to a rack and pinion mechanism. The steering ECU drives the electric motor and changes the direction of the steering wheel according to the information input from the second controller 160 or the information input from the driving operator 80.

[Self-Propelled Parking Event—at the Time of Entrance]

Figure 3:
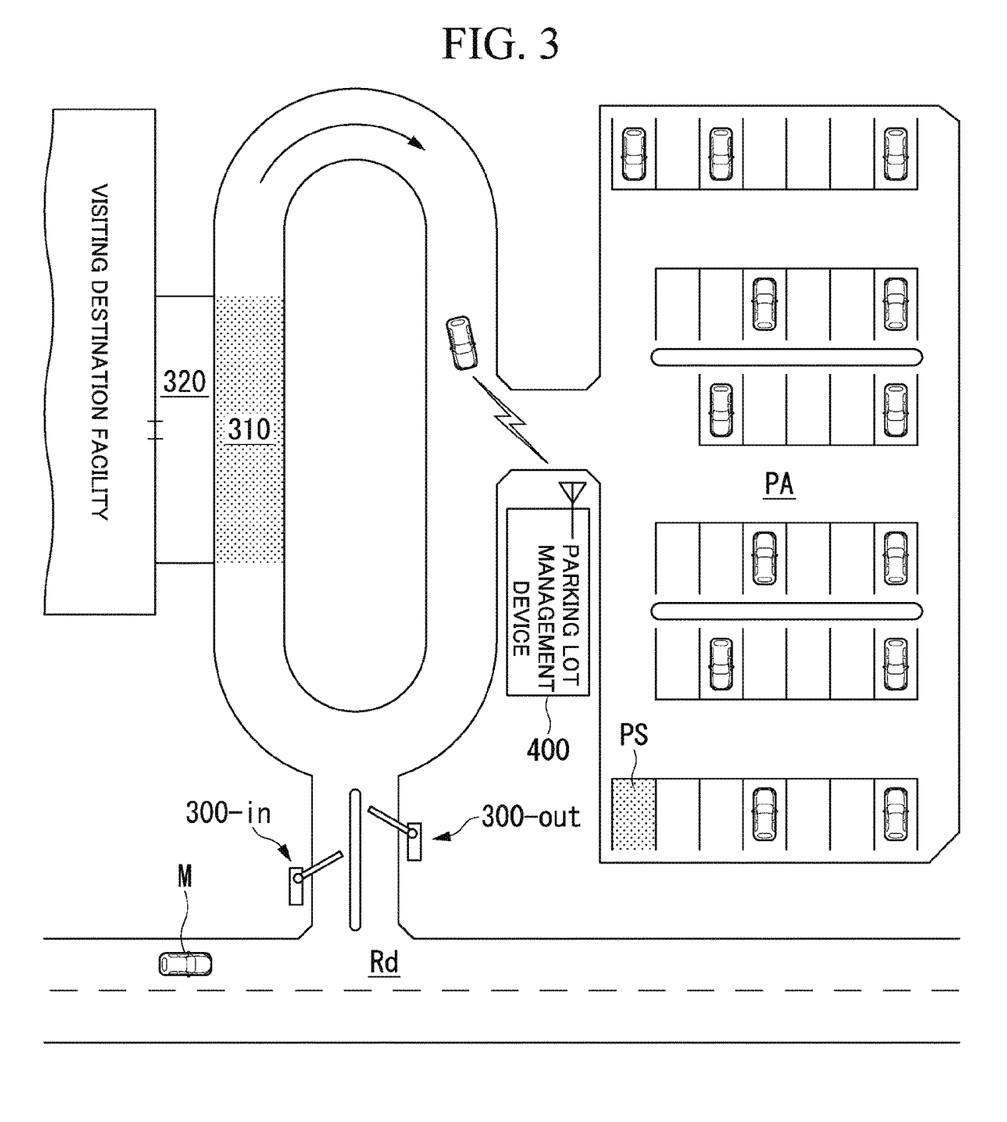
FIG. 3 is a diagram which schematically shows a scene in which a self-propelled parking event is executed.

The self-propelled parking controller 142 causes the host vehicle M to park in a parking space on the basis of, for example, information acquired from the parking lot management device 400 by the communication device 20. FIG. 3 is a diagram which schematically shows a scene in which a self-propelled parking event is executed. In a route from a road Rd to a visiting destination facility, gates 300-in and 300-out are provided. A visiting destination facility includes, for example, shopping stores, restaurants, accommodation facilities such as hotels, airports, hospitals, event venues, and the like.

The host vehicle M proceeds to the stop area 310 by passing through the gate 300-in by manual driving or automated driving. The manual driving means that the steering (the steering device 220) of the host vehicle M is controlled by the occupant operating a steering wheel, and the speed (the traveling drive force output device 200 and/or the brake device 210) of the host vehicle M is controlled by the occupant operating the accelerator pedal or the brake pedal. The automated driving means that at least one or both of the speed and the steering of the host vehicle M are controlled by the automated driving control device 100.

The stop area 310 is a region which faces the getting-on/off area 320 connected to the visiting destination facility, and in which parking is temporarily allowed for dropping the occupant from the vehicle at the getting-on/off area 320 or for allowing the occupant to get on the vehicle from the getting-on/off area 320. The getting-on/off area 320 is a region provided for the occupant to get off the vehicle, for the occupant to get on the vehicle, or for the occupant to wait at a corresponding spot until an arrival of the vehicle. The getting-on/off area 320 is typically provided on one side of a road in which the stop area 310 is provided. The getting-on/off area 320 may be provided with an eave to avoid rain, snow, and sunlight. The stop area 310 is an example of the "position at which the occupant of the vehicle gets on or off the vehicle."

For example, the host vehicle M stops at the stop area 310, and starts a self-propelled parking event in which it performs automated driving in an unmanned manner after the occupant is dropped off at the getting-on/off area 320 and autonomously moves to a parking space PS in the parking lot PA from the stop area 310. A start trigger of the self-propelled parking event may be, for example, that the host vehicle M has approached within a predetermined distance from the visiting destination facility, that the occupant has performed a certain operation, or that the communication device 20 has received a predetermined signal wirelessly from the parking lot management device 400.

When a self-propelled parking event is started by the action plan generator 140, the self-propelled parking controller 142 controls the communication device 20 such that a parking request is transmitted to the parking lot management device 400. The parking lot management device 400 which has received the parking request transmits a predetermined signal as a response to the parking request to a vehicle from which the parking request is transmitted when there is a space in which the vehicle can park in the parking lot PA. The host vehicle M which has received the predetermined signal moves from the stop area 310 to the parking lot PA according to a guidance by the parking lot management device 400 or while sensing by itself. When the self-propelled parking event is performed, the host vehicle M does not necessarily have to be unmanned, and an employee or the like of the parking lot PA may board the host vehicle M.

Figure 4:
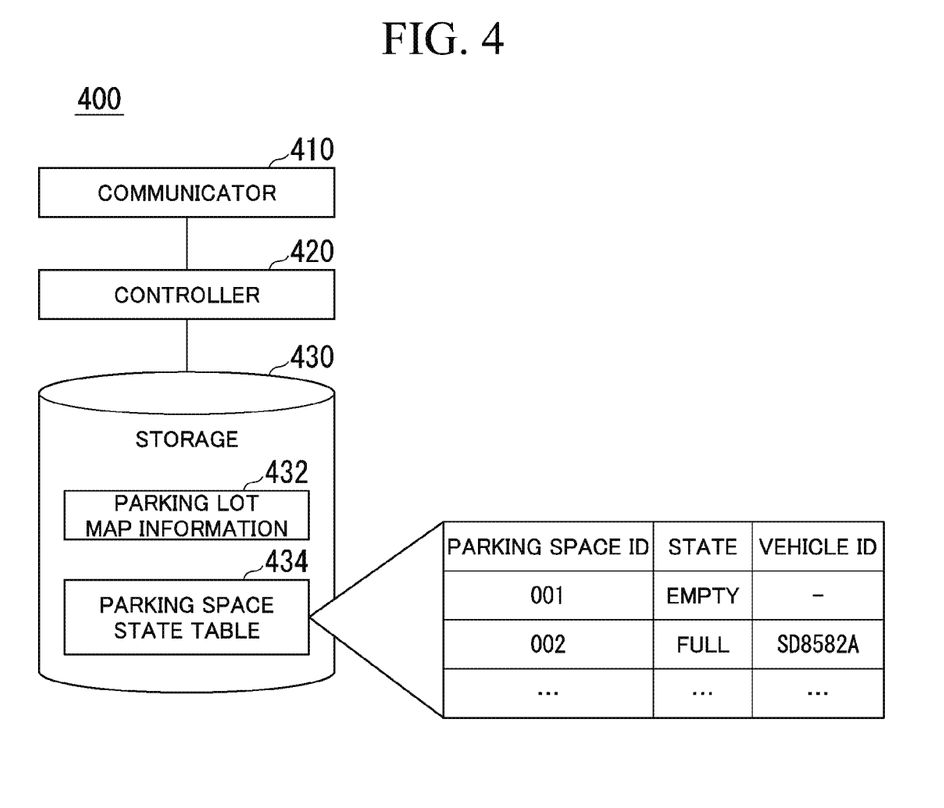
FIG. 4 is a diagram which shows an example of a configuration of a parking lot management device.

FIG. 4 is a diagram which shows an example of a configuration of the parking lot management device 400. The parking lot management device 400 includes, for example, a communicator 410, a controller 420, and a storage 430. The storage 430 stores parking lot map information 432 and information on a parking space state table 434 and the like.

The communicator 410 wirelessly communicates with the host vehicle M or other vehicles. The controller 420 guides a vehicle to the parking space PS on the basis of information acquired (received) by the communicator 410 and information stored in the storage 430. The parking lot map information 432 is information in which a structure of the parking lot PA is geometrically represented, and includes, for example, coordinates for each parking space PS. The parking space state table 434 is a table in which, for example, a state indicating whether a parking space is empty or full (parking) and a vehicle ID that is identification information of a parking vehicle when the parking space is full are associated with a parking space ID that is identification information of the parking space PS.

If the communicator 410 receives a parking request from a vehicle, the controller 420 extracts a parking space PS which is in the empty state with reference to the parking space state table 434, acquires a position of the extracted parking space PS from the parking lot map information 432, and transmits route information indicating a preferred route to the position of the acquired parking space PS to the vehicle using the communicator 410. The controller 420 may instructs a specific vehicle to stop or slow down when necessary on the basis of a positional relationship of a plurality of vehicles such that the vehicles do not proceed to the same position at the same time.

When the host vehicle M receives route information from the parking lot management device 400, the self-propelled parking controller 142 generates a target trajectory based on the route. For example, the self-propelled parking controller 142 may set a speed lower than a speed limit in the parking lot PA as a target speed in a route from a current position of the host vehicle M to the parking space PS, and generate a target trajectory in which trajectory points are arranged at the center of a road in the parking lot PA. When the host vehicle M approaches a target parking space PS, the space recognizer 134 recognizes a parking frame or the like which divides off the parking space PS, and recognizes a relative position of the parking space PS with respect to the host vehicle M. If the space recognizer 134 recognizes a position of the parking space PS, the space recognizer 134 provides a result of the recognition such as an orientation of the recognized parking space PS (a direction of the parking space viewed from the host vehicle M) and a distance to the parking space PS to the self-propelled parking controller 142. The self-propelled parking controller 142 corrects the target trajectory on the basis of the provided result of the recognition. The second controller 160 controls the steering and speed of the host vehicle M according to the target trajectory corrected by the self-propelled parking controller 142, thereby causing the host vehicle M to park in the parking space PS.

[Self-Propelled Parking Event—at the Time of Exit]

The action plan generator 140 and the communication device 20 maintain the operation states even while the host vehicle M parks. For example, it may be assumed that, as a start trigger of the self-propelled parking event, the occupant of the host vehicle M has operated a terminal device such as a mobile phone to transmit a pick-up request to the communication device 20 of the host vehicle M. If the pick-up request transmitted by a terminal device of the occupant is received by the communication device 20, the action plan generator 140 executes a self-propelled parking event and causes the self-propelled parking controller 142 to be started. The started self-propelled parking controller 142 generates a target trajectory for causing the host vehicle M to move from the parking space PS in which the host vehicle M has parked to the stop area 310. The second controller 160 causes the host vehicle M to move to the stop area 310 according to the target trajectory generated by the self-propelled parking controller 142. For example, the self-propelled parking controller 142 may set a speed lower than the speed limit in the parking lot PA as a target speed in a route to the stop area 310 and generate a target trajectory in which trajectory points are arranged at the center of a road in the parking lot PA.

If the host vehicle M approaches the stop area 310, the space recognizer 134 recognizes the getting-on/off area 320 facing the stop area 310, and the object recognizer 132 recognizes objects such as people or luggage present in the getting-on/off area 320 recognized by the space recognizer 134. Furthermore, the object recognizer 132 recognizes the occupant of the host vehicle M among one or more people present in the getting-on/off area 320. For example, when there are a plurality of people present in the getting-on/off area 320 and a plurality of candidates for the occupant, the object recognizer 132 may recognize the occupant of the host vehicle M by distinguishing the occupant from the other occupants on the basis of an electric wave intensity of the terminal device held by the occupant of the host vehicle M and an electric wave intensity of an electronic key that can lock, unlock, or the like of the host vehicle M. For example, the object recognizer 132 may recognize a candidate for the occupant having the strongest electric wave intensity as the occupant of the host vehicle M. The object recognizer 132 may recognize the occupant of the host vehicle M by distinguishing the occupant from the other occupants on the basis of a feature amount of the face of each candidate for the occupant, and the like. If the host vehicle M approaches the occupant of the host vehicle M, the self-propelled parking controller 142 corrects the target trajectory by further reducing the target speed or bringing a trajectory point closer to the getting-on/off area 320 from the center of a road. In response, the second controller 160 brings the host vehicle M closer to the getting-on/off area 320 side and causes it to stop in the stop area 310.

When the self-propelled parking controller 142 generates a target trajectory by receiving a pick-up request, it controls the communication device 20 and transmits a start request to the parking lot management device 400. If the controller 420 of the parking lot management device 400 receives the start request, it instructs a specific vehicle to stop or slow down when necessary such that a plurality of vehicles do not proceed to the same position at the same time on the basis of a positional relationship of the vehicles like at the time of entrance. If the host vehicle M moves to the stop area 310 and the occupant in the getting-on/off area 320 boards the host vehicle M, the self-propelled parking controller 142 stops operating. That is, the self-propelled parking event ends. Subsequently, the automated driving control device 100 plans a merging event that causes the host vehicle M to merge with a road in a city from the parking lot PA and performs automated driving on the basis of a planned event, or the occupant manually drives the host vehicle M by himself or herself.

The present invention is not limited to the description above, and the self-propelled parking controller 142 may find an available parking space PS by itself on the basis of a result of detection by the camera 10, the radar device 12, the finder 14, or the object recognition device 16 regardless of communication and cause the host vehicle M to park in the found parking space PS.

[Processing Flow at the Time of Exit]

Figure 5:
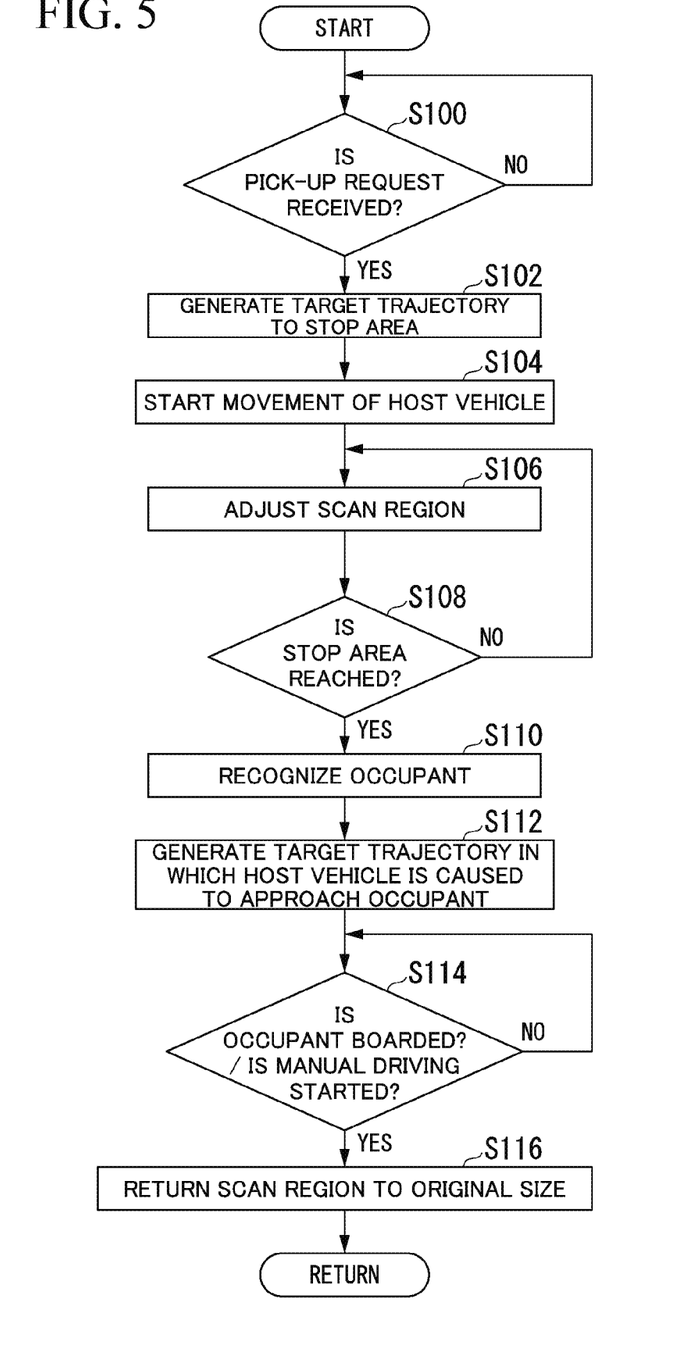
FIG. 5 is a flowchart which shows an example of a series of processing performed by an automated driving control device according to the embodiment.

In the following description, a series of processing performed by the automated driving control device 100 at the time of exit will be described using a flowchart. FIG. 5 is a flowchart which shows an example of a series of processing performed by the automated driving control device 100 according to the embodiment. The processing of this flowchart may be, for example, repeatedly performed in a predetermined cycle. While the processing of this flowchart is performed, the object recognizer 132 and the space recognizer 134 continue to perform various types of recognition unless otherwise stated.

First, the action plan generator 140 waits before a pick-up request is received by the communication device 20 (step S100), and executes a self-propelled parking event if the pick-up request is received by the communication device 20. In response, the self-propelled parking controller 142 generates a target trajectory in which the host vehicle M is caused to move from a parking space PS where the host vehicle M parks to the stop area 310 (step S102).

Next, the second controller 160 performs automated driving on the basis of the target trajectory generated by the self-propelled parking controller 142 when the pick-up request is received, and starts causing the host vehicle M to move to the stop area 310 (step S104).

Next, the scan controller 136 adjusts scan regions of the object recognizer 132 and the space recognizer 134 in accordance with an approach of the host vehicle M to the stop area 310 (step S106).

Figure 6:
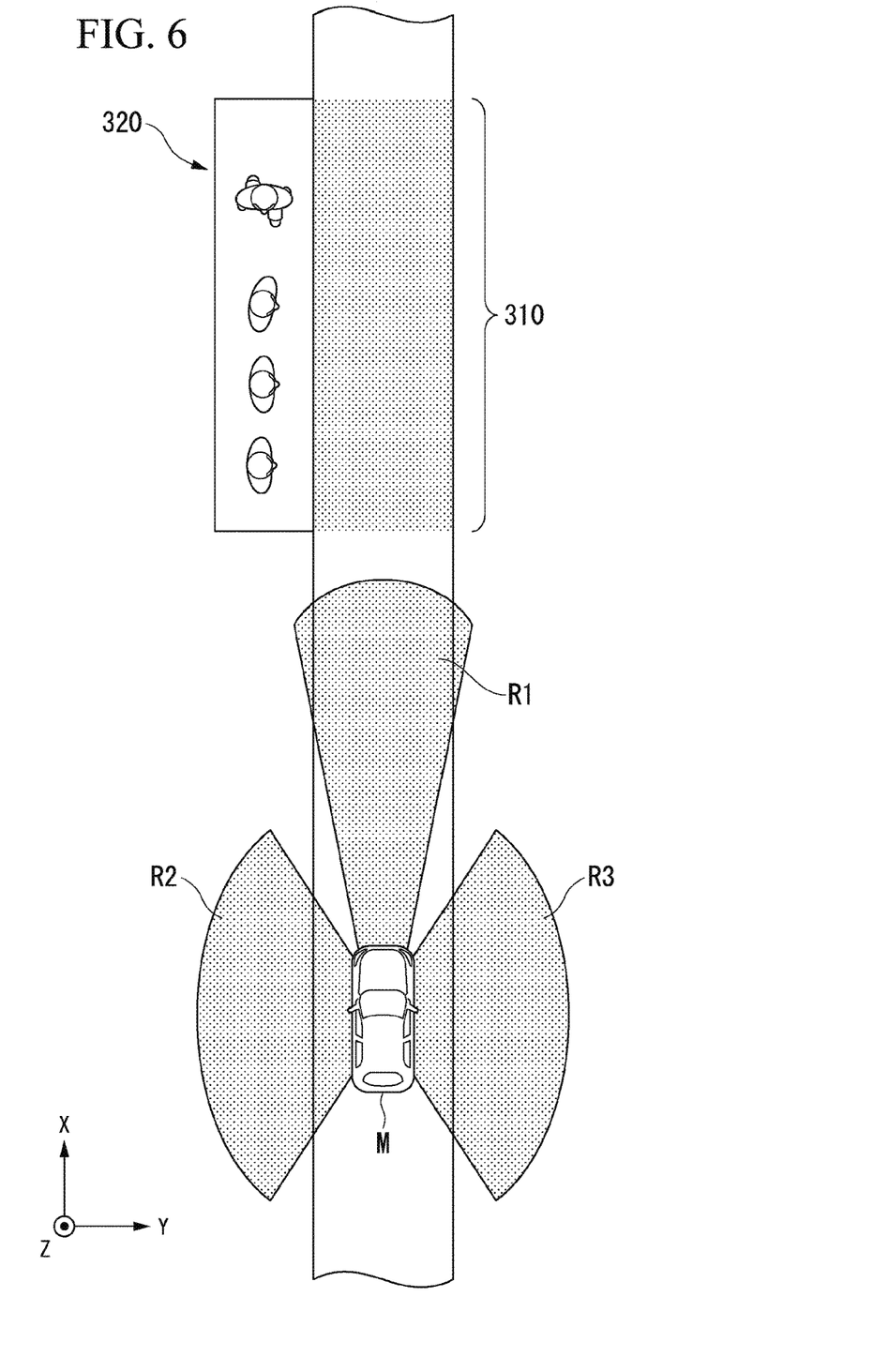
FIG. 6 is a diagram which schematically shows a state at the time of approaching a stop area.

FIG. 6 is a diagram which schematically shows a state at the time of approaching the stop area 310. An X axis in FIG. 6 represents any one direction of a horizontal plane, a Y axis represents another direction of the horizontal plane, that is orthogonal to the X direction, and a Z axis represents a vertical direction orthogonal to an X-Y plane that is the horizontal plane.

For example, when the scan regions of the object recognizer 132 and the space recognizer 134 are regions R1, R2, and R3 shown in FIG. 6, the scan controller 136 adjusts the scan regions by making a scan region R3 with a scan target of a space on a right side of the stop area 310 in which the getting-on/off area 320 is not present smaller than a scan region R2 with a scan target of a space on a left side of the stop area 310 in which the getting-on/off area 320 is present near the stop area 310. The scan region R2 shown in FIG. 6 is an example of a "second region," and the scan region R3 is an example of a "first region."

Figure 7:
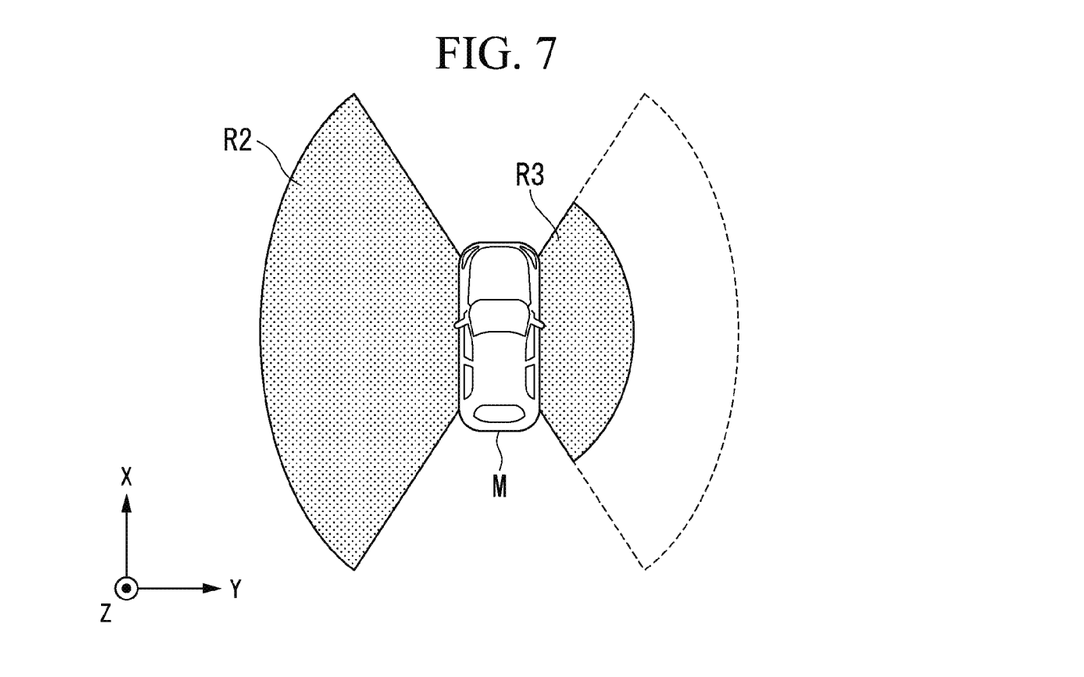
FIG. 7 is a diagram showing a reduction of a scan region.
Figure 8:
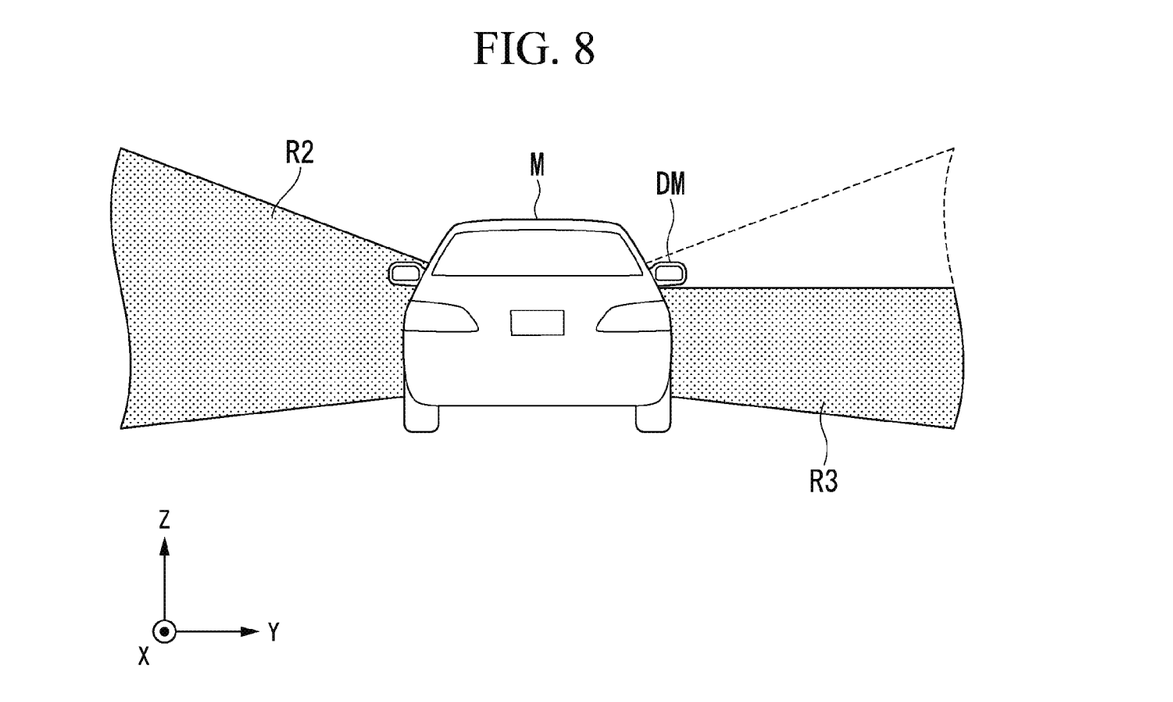
FIG. 8 is a diagram showing the reduction of a scan region.

FIGS. 7 and 8 are diagrams showing a reduction of the scan region. The host vehicle M viewed from above is shown in the example of FIG. 7, and the host vehicle M viewed from behind is shown in the example of FIG. 8. For example, the scan controller 136 may reduce the scan region R3 in the X-Y plane and limit spreading of the scan region R3 in a horizontal direction as shown in FIG. 7. For example, as shown in FIG. 8, the scan controller 136 may reduce the scan region R3 in a Z-Y plane and limit the spreading of the scan region R3 in a vertical direction. Specifically, the scan controller 136 reduces the scan region R3 by cutting a region of the scan region R3 above a certain reference position (for example, a door mirror DM) in the vertical direction (Z direction). The scan controller 136 may not have to make a region size zero by cutting the region of the scan region R3 above the reference position in the vertical direction, and may reduce the region above the reference position in the vertical direction to about ½ or ⅓ times. The scan controller 136 may reduce the scan region R3 in one of the horizontal direction and the vertical direction, and may reduce the scan region R3 in both the horizontal direction and the vertical direction.

The scan controller 136 determines how much to reduce a scan region on the basis of a distance D from the host vehicle M to the stop area 310, a speed VM of the host vehicle M when the stop area 310 is approached, or both the distance D and the speed VM when the scan region is reduced. In the following description, a degree of reduction of the scan region will be referred to as a "degree of reduction R" and described.

Figure 9:
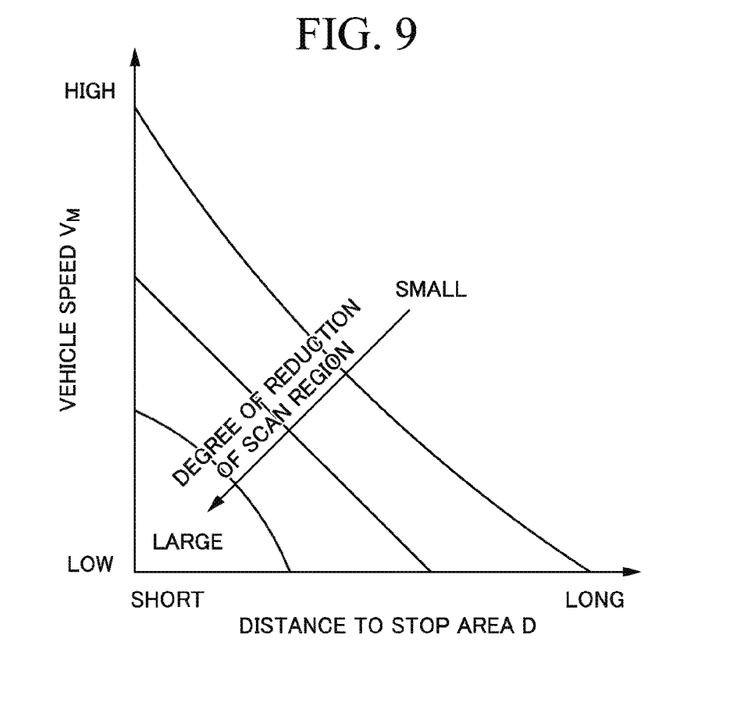
FIG. 9 is a diagram which shows an example of a relationship among a distance to a stop area, a speed of a host vehicle, and a degree of reduction in a scan region.

FIG. 9 is a diagram which shows an example of a relationship among the distance D to the stop area 310, the speed $V_M$ of the host vehicle M, and the degree of reduction R of a scan region. As shown in FIG. 9, for example, the scan controller 136 increases the degree of reduction R of a scan region as the distance D to the stop area 310 decreases, and decreases the degree of reduction R as the distance D to the stop area 310 extends. In other words, the scan controller 136 reduces the scan region as the host vehicle M approaches the stop area 310, and keeps a size of the scan region as it is when the host vehicle M departs from the stop area 310 and moves away from the stop area 310. The scan controller 136 increases the degree of reduction R of a scan region as the speed $V_M$ of the host vehicle M at the time of approaching the stop area 310 is lowered, and decreases the degree of reduction R of a scan region as the speed $V_M$ of the host vehicle M at the time of approaching the stop area 310 increases. In other words, the scan controller 136 further reduces a scan region as the host vehicle M is slower, and keeps the size of the scan region as it is as the host vehicle M is faster.

If the scan controller 136 reduces a scan region on one side among scan regions of both sides of the host vehicle M, it may shorten the scan cycle T of a scan region on the other side as compared to when the scan region on one side is not reduced.

For example, when the scan region R3 is reduced among the scan regions R2 and R3, the scan controller 136 shortens the scan cycle T of the scan region R2 in accordance with a degree of reduction R of the scan region R3.

Figure 10:
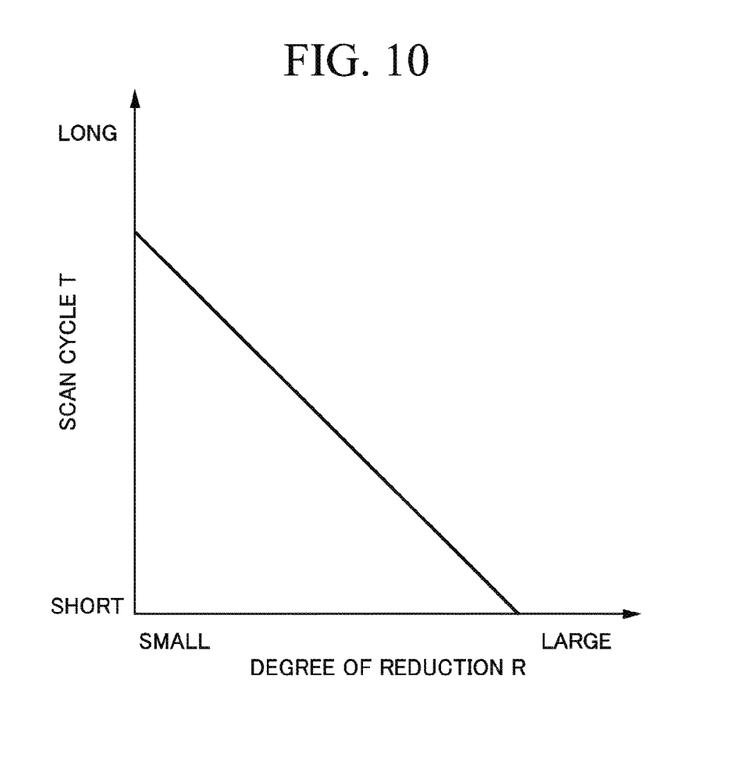
FIG. 10 is a diagram which shows an example of a relationship between a degree of reduction and a scan cycle.

FIG. 10 is a diagram which shows an example of a relationship between the degree of reduction R and the scan cycle T. As shown in FIG. 10, for example, the scan controller 136 may extend the scan cycle T (decrease the scan frequency F) as the degree of reduction R decreases, and shorten the scan cycle T (increase the scan frequency F) as the degree of reduction R increases.

As described above, if a scan region on one side among scan regions on both sides of the host vehicle M is reduced, the scan cycle T of a scan region on the other side is shortened, and thus processing resources of a processor or a memory which have been increased by reducing a size of one scan region can be effectively used for speeding up of a scan for the other scan region.

The scan controller 136 may also shorten the scan cycle T in accordance with a processing load of a processor or a memory such as a CPU or a GPU that realizes the automated driving control device 100.

Returning to the description of the flowchart of FIG. 5, the scan controller 136 next determines whether the host vehicle M has reached the stop area 310 (step S108). When the host vehicle M has not reached the stop area 310 yet, the procedure returns to the processing of S106 and S108, and one of the scan regions is dynamically reduced and the scan cycle T of the other scan region is determined in accordance with the degree of reduction R of the one scan region and the processing load of a processor or a memory. As described above, since the processing of S106 and S108 is repeated until the host vehicle M reaches the stop area 310, the one scan region is gradually reduced and the scan cycle T of the other scan region is gradually shortened.

On the other hand, when the scan controller 136 determines that the host vehicle M has reached the stop area 310, the recognizer 130 recognizes the getting-on/off area 320 facing the stop area 310, and further recognizes the occupant of the host vehicle M in the recognized getting-on/off area 320 (step S110).

Next, the self-propelled parking controller 142 newly generates a target trajectory in which a target speed is further reduced or a trajectory point is brought closer to the getting-on/off area 320 from a center of a road (step S112). As a result, the host vehicle M in the stop area 310 approaches the occupant waiting for the host vehicle M in the getting-on/off area 320.

Next, when the host vehicle M has approached the occupant in the getting-on/off area 320, the scan controller 136 waits until the occupant boards the host vehicle M or until the occupant having boarded the host vehicle M starts manual driving (step S114), and, when the occupant has boarded the host vehicle M or when the occupant has started manual driving, a region size of the reduced scan region is returned to an original size before the reduction (step S116) and processing of this flowchart ends.

According to the embodiment described above, the host vehicle M is caused to move to the stop area 310 as valet parking by recognizing the vicinity situation of the host vehicle M and performing automated driving on the host vehicle M on the basis of the recognized vicinity situation, and, when the host vehicle M is moved to the stop area 310, surplus processing resources of a processor or a memory can be secured by reducing a scan region on a side on which the getting-on/off area 320 is not present and the occupant does not board. As a result, since the scan speed of a scan region that has not been reduced, that is, a scan region on a side on which the getting-on/off area 320 is present and the occupant boards, can be improved using the surplus processing resources, a recognition accuracy of the occupant can be improved. As a result, it is possible to cause the vehicle to appropriately approach near the occupant (an example of a user).

In the embodiment described above, it is described that the automated driving control device 100 reduces a detection load by reducing a scan region, but the present invention is not limited thereto. For example, the automated driving control device 100 may reduce the detection load by decreasing a scan frequency (extending a scan cycle) in addition to or instead of reducing a scan region. That is, the automated driving control device 100 may reduce the detection load by lowering a resolution in a scan region. When the resolution in one scan region is lowered, since the resolution of a scan region whose resolution is not lowered, that is, the resolution of a scan region on a side on which the getting-on/off area 320 is present and the occupant boards, can be improved using the surplus processing resources by improving the resolution in the other scan region, the recognition accuracy of the occupant can be improved.

[Hardware Configuration]

Figure 11:
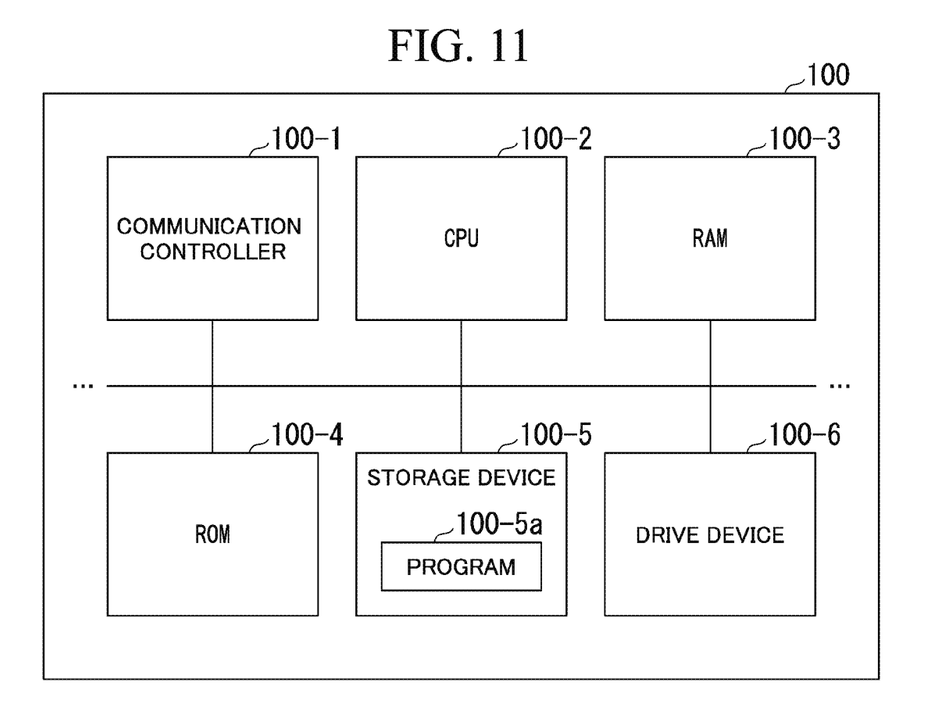
FIG. 11 is a diagram which shows an example of a hardware configuration of the automated driving control device of the embodiment.

FIG. 11 is a diagram which shows an example of a hardware configuration of the automated driving control device 100 of the embodiments. As shown in FIG. 11, the automated driving control device 100 is configured to include a communication controller 100-1, a CPU 100-2, a RAM 100-3 used as a working memory, a ROM 100-4 that stores a booting program and the like, a storage device 100-5 such as a flash memory or an HDD, a drive device 100-6, and the like being connected to one another by an internal bus or a dedicated communication line. The communication controller 100-1 communicates with components other than the automated driving control device 100. The storage device 100-5 stores a program 100-5a executed by the CPU 100-2. This program is expanded in the RAM 100-3 by a direct memory access (DMA) controller (not shown) or the like and executed by the CPU 100-2. As a result, some or all of the first controller 120 and the second controller 160 are realized.

The embodiments described above can be expressed as follows.

A vehicle control device is configured to include a storage that is configured to store a program, and a processor, in which the processor executes the program, thereby detecting a vicinity situation of a vehicle, causing the vehicle to move to a stop position at which a user of the vehicle can get on or off the vehicle by controlling the speed and steering of the vehicle on the basis of the detected vicinity situation, and reducing a detection load of the vicinity situation when the vehicle moves to the position as compared to when the vehicle does not move to the position.

As described above, the forms for implementing the present invention have been described using the embodiments. However, the present invention is not limited to such embodiments, and various modifications and substitutions may be added in a range not departing from the gist of the present invention.

What is claimed is:

1. A vehicle control device comprising:
a detector configured to detect a vicinity situation of a vehicle;
a first controller configured to cause the vehicle to move to a position at which a user of the vehicle gets on or gets off the vehicle by controlling a speed and steering of the vehicle on the basis of the vicinity situation detected by the detector; and
a second controller configured to reduce a detection load of the detector when the vehicle moves to the position as compared to when the vehicle does not move to the position,
wherein the detector is configured to detect regions on both sides of the vehicle, and
the second controller is configured to reduce the detection load by making, among the regions on both sides of the vehicle near the position, a first region on a side in which the user is assumed not to be present smaller than a second region on the other side in which the user is assumed to be present until the vehicle moves to the position.

2. The vehicle control device according to claim 1, wherein the second controller is configured to reduce a region of the first region above a reference position in a vertical direction.

3. The vehicle control device according to claim 1, wherein the second controller is configured to reduce the first region in a horizontal direction.

4. The vehicle control device according to claim 1, wherein the detector is configured to detect the vicinity situation by repeatedly scanning an interior of the region, and
the second controller, when the first region is reduced, is configured to shorten a scan cycle at the time of scanning the second region as compared to when the first region is not reduced.

5. The vehicle control device according to claim 4, wherein the second controller is configured to shorten the scan cycle of the second region in accordance with a degree of reduction of the first region.

6. The vehicle control device according to claim 1, wherein the second controller is configured to reduce the detection load as the vehicle approaches the position, and does not reduce the detection load when the vehicle has departed from the position.

7. The vehicle control device according to claim 1, wherein the second controller is configured to reduce the detection load as a speed of the vehicle at the time of approaching the position decreases.

8. The vehicle control device according to claim 1, wherein the second controller is configured to return the reduced detection load to an original size before the reduction when the user has started manual driving.

9. A vehicle control method comprising:
by a computer,
detecting a vicinity situation of a vehicle;
causing the vehicle to move to a position at which a user of the vehicle gets on or off the vehicle by controlling a speed and steering of the vehicle on the basis of the detected vicinity situation;
reducing a detection load of the vicinity situation when the vehicle moves to the position as compared to when the vehicle does not move to the position;
detecting regions on both sides of the vehicle; and
reducing the detection load by making, among the regions on both sides of the vehicle near the position, a first region on a side in which the user is assumed not to be present smaller than a second region on the other side in which the user is assumed to be present until the vehicle moves to the position.

10. A computer-readable non-transitory storage medium that is configured to store a program causing an on-vehicle computer to execute:
detecting a vicinity situation of a vehicle;
causing the vehicle to move to a position at which a user of the vehicle gets on or off the vehicle by controlling a speed and steering of the vehicle on the basis of the detected vicinity situation;
reducing a detection load of the vicinity situation when the vehicle moves to the position as compared to when the vehicle does not move to the position;
detecting regions on both sides of the vehicle; and
reducing the detection load by making, among the regions on both sides of the vehicle near the position, a first region on a side in which the user is assumed not to be present smaller than a second region on the other side in which the user is assumed to be present until the vehicle moves to the position.

* * * * *